US010069989B2

(12) United States Patent
Koguchi et al.

(10) Patent No.: US 10,069,989 B2
(45) Date of Patent: Sep. 4, 2018

(54) HUMAN BODY DETECTING DEVICE

(71) Applicants: Shigekazu Koguchi, Kanagawa (JP); Kenichi Iwata, Kanagawa (JP); Yohei Sakon, Kanagawa (JP)

(72) Inventors: Shigekazu Koguchi, Kanagawa (JP); Kenichi Iwata, Kanagawa (JP); Yohei Sakon, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/182,460

(22) Filed: Jun. 14, 2016

(65) Prior Publication Data
US 2016/0381240 A1 Dec. 29, 2016

(30) Foreign Application Priority Data
Jun. 29, 2015 (JP) .................. 2015-130277

(51) Int. Cl.
*H04N 1/00* (2006.01)
*G06K 9/00* (2006.01)
(52) U.S. Cl.
CPC ..... *H04N 1/00891* (2013.01); *G06K 9/00369* (2013.01); *H04N 1/00896* (2013.01)
(58) Field of Classification Search
CPC .......... H04N 1/00891; H04N 1/00896; G06K 9/00369
USPC .................. 358/1.13, 1.14, 1.15; 399/37
See application file for complete search history.

(56) References Cited

U.S. PATENT DOCUMENTS

| 7,203,431 B2 | 4/2007 | Shoji et al. | |
| 9,288,354 B2 | 3/2016 | Hirose | |
| 2014/0063528 A1* | 3/2014 | Hirose | H04N 1/00323 358/1.13 |

FOREIGN PATENT DOCUMENTS

| JP | 3504017 | 3/2004 |
| JP | 2005-266380 | 9/2005 |
| JP | 2014-053734 | 3/2014 |
| JP | 2016-051077 | 4/2016 |

* cited by examiner

Primary Examiner — Jamares Q Washington
(74) Attorney, Agent, or Firm — Duft Bornsen & Fettig LLP

(57) ABSTRACT

A disclosed human body detecting device includes a human body detector configured to detect a human body, and an electric power supply status switching part configured to switch a first shifting mode to a second shifting mode when the human body detecting device is not operated, and the human body detector continuously detects the human body for a predetermined time. The first shifting mode indicates a first status shifting to a second status based on a first condition in which the human body is detected by the human body detector, the second status representing electric energy consumption less than electric energy consumption of the first status, and the second shifting mode indicates the first status shifting to the second status based on a second condition other than the first condition.

15 Claims, 15 Drawing Sheets

FIG.3A

| STANDBY MODE→ENERGY-SAVING MODE | | |
|---|---|---|
| TRIGGER | HUMAN BODY DETECTOR OPERATING MODE | HUMAN BODY DETECTOR FAILING MODE |
| ENERGY-SAVING BUTTON: DEPRESSED | YES | YES |
| HUMAN BODY DETECTOR: PERSON ABSENT, AND ENERGY-SAVING TRANSITION TIMER: TIME-UP | YES | NO |
| HUMAN BODY DETECTOR: PERSON ABSENT, AND OPERATIONS DEVICE: UNOPERATED | YES | NO |
| ENERGY-SAVING TRANSITION TIMER: TIME-UP | NO | YES |

FIG.3B

| ENERGY-SAVING MODE→STANDBY MODE | | |
|---|---|---|
| TRIGGER | HUMAN BODY DETECTOR OPERATING MODE | HUMAN BODY DETECTOR FAILING MODE |
| ENERGY-SAVING BUTTON: DEPRESSED | YES | YES |
| PRINT DATA: INPUT | YES | YES |
| ADF: DOCUMENT SET | YES | YES |
| PLATEN: OPEN OR CLOSED | YES | YES |
| HUMAN BODY DETECTOR: PERSON PRESENT | YES | NO |

FIG.11

| TIME SERIES | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| DETECTED SIGNAL | 0 | 0 | 0 | 1 | 1 | 1 | 1 | 0 | 0 | 0 | 1 | 1 | 1 | 1 | 0 | 0 | 0 | 1 | 1 | 1 | 1 | 0 | 0 | 0 |

FIG.13

| TIME SERIES | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| FAILURE PATTERN A | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| FAILURE PATTERN B | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| DETECTED SIGNAL | 0 | 0 | 0 | 1 | 1 | 1 | 1 | 0 | 0 | 0 | 1 | 1 | 1 | 1 | 0 | 0 | 0 | 1 | 1 | 1 | 1 | 0 | 0 | 0 |

FIG.15

| TIME SERIES | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| DETECTED SIGNAL | 0 | 0 | 0 | 1 | 1 | 1 | 1 | 0 | 0 | 0 | 1 | 1 | 1 | 1 | 0 | 0 | 0 | 1 | 1 | 1 | 1 | 0 | 0 | 0 |

HUMAN BODY DETECTING DEVICE

CROSS-REFERENCE TO RELATED APPLICATIONS

The present application is based on and claims the benefit of priority of Japanese Priority Application No. 2015-130277 filed on Jun. 29, 2015, the entire contents of which are hereby incorporated herein by reference.

BACKGROUND OF THE INVENTION

1. Field of the Invention

The disclosures herein generally relate to a human body detecting device.

2. Description of the Related Art

Related art technologies disclose an apparatus having a human body sensor configured to switch, when the human body sensor has sensed a human body, the apparatus to a standby mode from an energy-saving mode.

RELATED ART DOCUMENTS

Patent Documents

Patent Document 1: Japanese Unexamined Patent Application Publication No. 2014-53734
Patent Document 2: Japanese Patent No. 3504017

SUMMARY OF THE INVENTION

According to an aspect of embodiments, there is provided a human body detecting device that includes a human body detector configured to detect a human body; and an electric power supply status switching part configured to switch a first shifting mode to a second shifting mode when the human body detecting device is not operated, and the human body detector continuously detects the human body for a predetermined time, where the first shifting mode indicates a first status shifting to a second status based on a first condition in which the human body is detected by the human body detector, the second status representing electric energy consumption less than electric energy consumption of the first status, and the second shifting mode indicates the first status shifting to the second status based on a second condition other than the first condition.

Other objects, features and advantages of the present invention will become more apparent from the following detailed description when read in conjunction with the accompanying drawings.

BRIEF DESCRIPTION OF THE DRAWINGS

FIGS. 3A and 3B are diagrams illustrating examples of conditions for shifting an operating status in a human body detector operating mode and a human body detector failing mode;

FIG. 11 is an explanatory diagram illustrating the failure restoration determination process of the third embodiment;

FIG. 13 is an explanatory diagram illustrating the failure restoration determination process of the fourth embodiment;

FIG. 15 is an explanatory diagram illustrating the failure restoration determination process of the fifth embodiment.

DETAILED DESCRIPTION OF THE PREFERRED EMBODIMENTS

Figure 1:
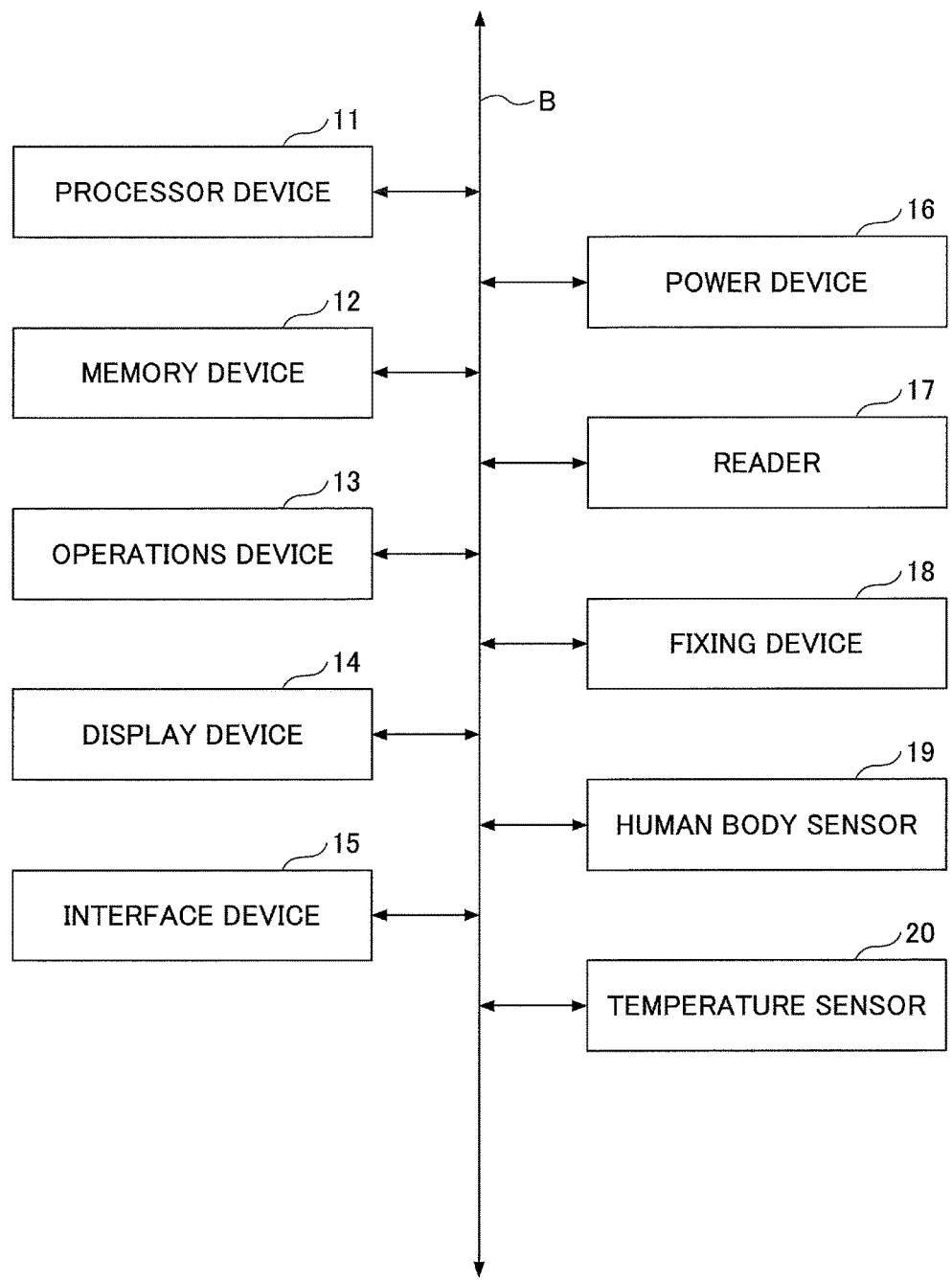
FIG. 1 is a diagram illustrating a hardware configuration example of an image forming apparatus according to a first embodiment.

The following describes embodiments of the present invention with reference to accompanying drawings. In the drawings, identical components or parts are provided with the same reference numbers to omit duplicated illustrations.

In the following embodiments of the present invention, an image forming apparatus is employed to be approached by and operated by users as an example of a human body detecting device; however, the invention is not limited to this example, and the invention may include any other apparatuses to be approached by and operated by the users.

First Embodiment

The following describes a hardware configuration of an image forming apparatus according to a first embodiment. FIG. 1 is a diagram illustrating a hardware configuration example of an image forming apparatus according to a first embodiment.

As illustrated in FIG. 1, an image forming apparatus includes a processor device 11, a memory device 12, an operations device 13, a display device 14, an interface device 15, a power device 16, a reader 17, a fixing device 18, a human body sensor 19, and a temperature sensor 20.

The processor device 11 is configured to execute a control program stored in the memory device 12 to control processes of the overall image forming apparatus. An example of the processor device 11 is a central processing unit (CPU).

The memory device 12 includes a read only memory (ROM), a random access memory (RAM), a hard disk drive (HDD), and a non-volatile RAM (NVRAM). The ROM is configured to store the control program and the like. The RAM is configured to serve as a work area for executing the control program stored in the ROM. The HDD and NVRAM are configured to store control parameters that need to be updated or various types of data. The control parameters or various types of data stored in the HDD or NVRAM are loaded by the processor device 11 in the RAM.

The operations device 13 is configured to receive operations such as various types of data input by users. Examples of the operations device 13 include a keyboard, a mouse, various types of hard buttons and a touch panel.

The display device 14 is configured to display various types of data. An example of the display device 14 is a liquid crystal display (LCD).

The interface device 15 is configured to connect a bus B and various types of hardware or networks, and control the connections of the bus B and various types of hardware or networks.

The power device 16 is configured to convert voltages input from a commercial power source into voltages necessary for the image forming apparatus to supply the converted voltages.

The reader 17 is configured to read documents, and may thus convert reflection light of the read documents into electric analog signals, convert the electric analog signals into digital image signals, and output the digital image signals to the fixing device 18.

The fixing device 18 is configured to perform image forming operations by fixing drawing materials such as toner on sheets of paper, based on the image data input from the reader 17 or the image data transmitted from a computer or the like connected to the image forming apparatus.

The human body sensor 19 may be a pyroelectric sensor, and is configured to generate electric analog signals as outputs when human bodies such as users of the image forming apparatus enter or exit a detection range of the human body sensor 19.

The temperature sensor 20 is configured to measure ambient temperature of the image forming apparatus.

In the above-described hardware configuration of the image forming apparatus, a program stored in the ROM may be read in the RAM, and the CPU may perform operations in accordance with the read program so as to form a controller 110, an engine controller 120, and a human body detector 130 described below. The functions of the image forming apparatus according to the first embodiment may be achieved by a combination of the system controller 110, the engine controller 120 and the engine controller 120, and the hardware described above.

Figure 2:
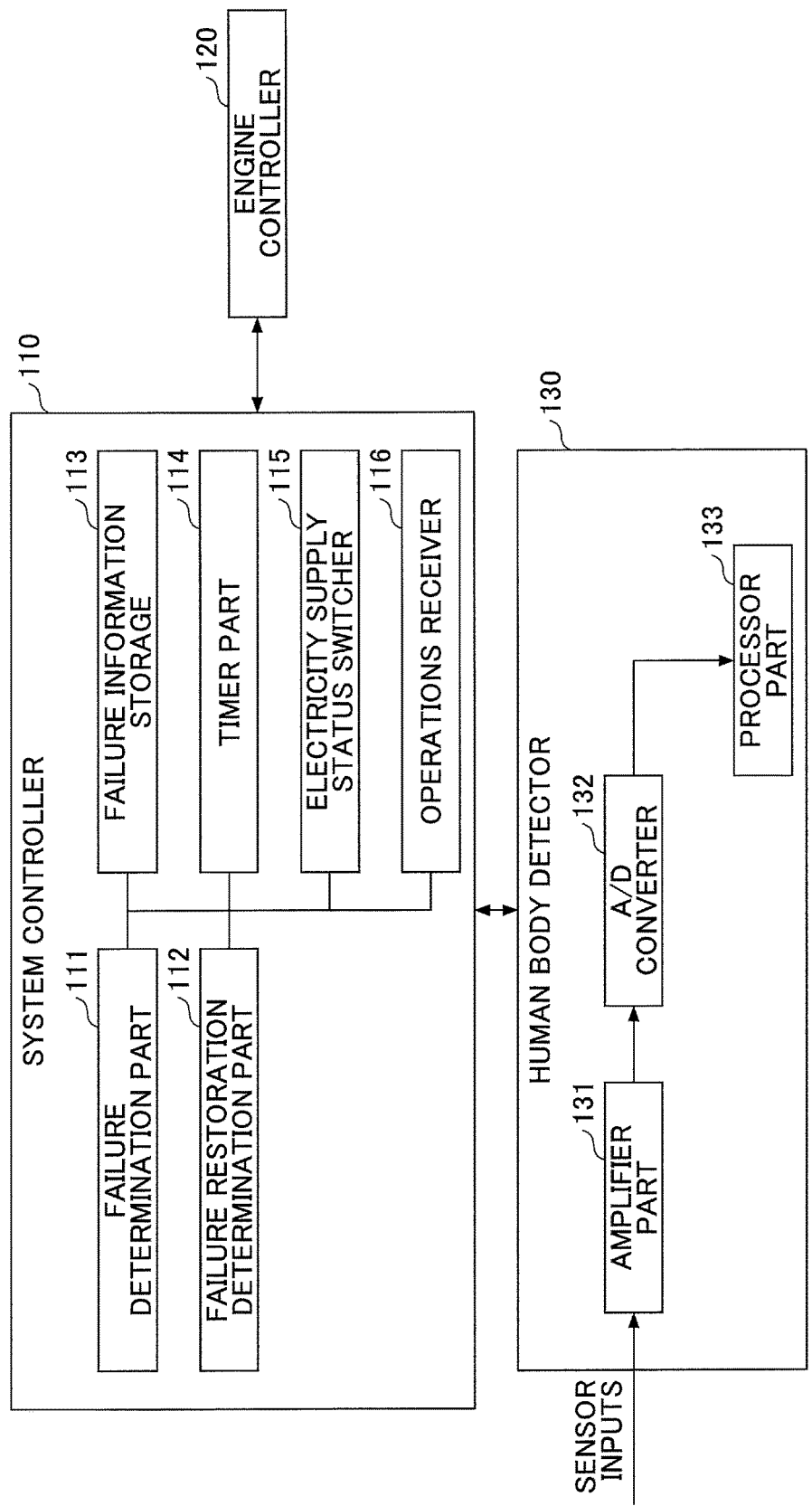
FIG. 2 is a diagram illustrating a functional configuration example of the image forming apparatus according to the first embodiment.

Next, an illustration is given of a functional configuration of the image forming apparatus according to the first embodiment. FIG. 2 is a diagram illustrating a functional configuration example of the image forming apparatus according to the first embodiment.

The image forming apparatus of the first embodiment includes a standby mode and an energy-saving mode as apparatus operating statuses.

The standby mode is an example of a first status indicating a status ready to start operations such as "ready to copy" or "ready to scan" displayed on the display device 14. The energy-saving mode is an example of a second status indicating a status consuming less electric energy but requiring time for starting copying or scanning longer than the standby mode.

The apparatus operating statuses are not specifically limited to the above-described modes insofar as the apparatus operating statuses include the first status and the second status exhibiting electric energy consumption less than the first status.

As illustrated in FIG. 2, the image forming apparatus includes the system controller 110, the engine controller 120, and the human body detector 130.

The system controller 110 includes a failure determination part 111, a failure restoration determination part 112, a failure information storage 113, a timer part 114, an electricity supply status switcher 115, and an operations receiver 116. The system controller 110 is configured to control operations of the image forming apparatus; the system controller 110 controls the power device 16, the reader 17, and the fixing device 18 via the engine controller 120 in accordance with the operating status of the image forming apparatus.

The failure determination part 111 is configured to monitor detection signals input from the human body detector 130 to determine whether the human body sensor 19 has failed. More specifically, when the failure determination part 111 receives the detection signal input from the human body detector 130 indicating "person present" for a continuous first time T1 (e.g., 10 min.), and no operation signal indicating the operations device 13 being operated from the operations receiver 116, the failure determination part 111 determines that the human body sensor 19 may have "possibly failed". Note that "person present" indicates a status in which the human body sensor 19 is detecting a human body. The detection signal input from the human body detector 130 will be described later.

When the failure determination part 111 receives a detection signal input from the human body detector 130 indicating "person present" for a continuous second time T2 (e.g., 24 hours) and no operation signal indicating the operations device 13 being operated from the operations receiver 116 after the determination indicating that the human body sensor 19 may have "possibly failed", the failure determination part 111 determines that the human body sensor 19 has "failed". On the other hand, when the failure determination part 111 receives a detection signal input from the human body detector 130 indicating "person absent" before the second time T2 has elapsed, the failure determination part 111 cancels the determination of the human body sensor 19 "possibly failed" and determines that the human body sensor 19 is "normal". Note that "person absent" indicates a status in which the human body sensor 19 is not detecting a human body.

The failure restoration determination part 112 is configured to execute a failure restoration determination process. Details of the failure restoration determination process will be described later.

The failure information storage 113 is configured to store failure information such as presence or absence of the failure of the human body sensor 19, and types of the failure.

The timer part 114 is configured to measure various types of time such as a continuous startup time of the image forming apparatus.

The electricity supply status switcher 115 is configured to switch a power switching mode from a "human body detector operating mode" to a "human body detector failing mode". The electricity supply status switcher 115 also switches the power switching mode from the "human body detector failing mode" to the "human body detector operating mode".

The human body detector operating mode is an example of a first shifting mode in which an operating status of the image forming apparatus is shifted based on the detection signal input from the human body detector 130. The human body detector failing mode is an example of a second shifting mode in which the operating status of the image forming apparatus is shifted based on a condition other than the detection signal input from the human body detector 130. Details of the human body detector operating mode and the human body detector failing mode will be described later.

The operations receiver 116 is configured to receive whether the operations device 13 has been operated by the user, and output a signal indicating whether the operations device 13 has been operated to the failure determination part 111 and the failure restoration determination part 112.

The human body detector 130 includes an amplifier part 131, an A/D converter 132, and a processor part 133.

The amplifier part 131 is configured to amplify an electric analog signal serving as an output of the human body sensor 19, and output the amplified electric analog signal to the A/D converter 132.

The A/D converter 132 is configured to convert the electric analog signal amplified by the amplifier part 131 into an A/D value, and output the A/D value to the processor part 133.

The processor part 133 is configured to determine "person present" or "person absent" based on the A/D value. The processor part 133 transmits the detection signal indicating the "person present" or "person absent" to the system controller 110. More specifically, the processor part 133 converts the A/D value that is an output of the A/D converter 132 into a binary signal ("1" or "0"), and transmits the binary signal to the system controller 110. Details of the conversion from the A/D value to the binary signal by the processor part 133 will be described later.

The following describes examples of conditions for shifting the operating status in the human body detector operating mode and the human body detector failing mode with reference to FIGS. 3A and 3B. FIGS. 3A and 3B are diagrams illustrating examples of conditions for shifting the operating status in a human body detector operating mode and a human body detector failing mode. More specifically, FIG. 3A depicts a table illustrating conditions in which the operating status of the image forming apparatus is shifted from the "standby mode" to the "energy-saving mode", and FIG. 3B depicts a table illustrating conditions in which the operating status of the image forming apparatus is shifted from the from the "energy-saving mode" to the "standby mode". These tables may be stored in the memory device 12 or the like. FIGS. 3A and 3B illustrate conditions any of which marked as "YES" are satisfied by triggers to shift the operating status of the image forming apparatus. Note that conditions marked as "NO" are not satisfied by the triggers to shift the operating status of the image forming apparatus.

As illustrated in FIG. 3A, in the human body detector operating mode, the operating status of the image forming apparatus is shifted from the "standby mode" to the "energy-saving mode" when any one of the following conditions 1a), 2a), and 3a) is satisfied, for example. Examples of the conditions 1a), 2a), and 3a) may be as follows. 1a) When an energy-saving button is depressed; 2a) When the detection signal input from the human body detector 130 indicates "person absent", and an energy-saving mode transition timer times up; and 3a) When the detection signal input from the human body detector 130 indicates "person absent", and the operations device 13 is not operated. Note that the energy-saving button is an operations part used to shift the operating status of the image forming apparatus to the energy-saving mode.

In the human body detector failing mode, the operating status of the image forming apparatus is shifted from the "standby mode" to the "energy-saving mode" when one of the following conditions 4a) and 5a is satisfied. The conditions 4a) and 5a) are as follows. 4a) When the energy-saving button is depressed; and 5a) When the energy-saving mode transition timer times up.

As illustrated in FIG. 3B, in the human body detector operating mode, the operating status of the image forming apparatus is sifted from the "energy-saving mode" to the "standby mode" when any of the following conditions 1b), 2b), 3b), 4b), and 5b) is satisfied. The conditions 1b), 2b), 3b), 4b), and 5b) are as follows. 1b) When the energy-saving button is depressed; 2b) When print data are input; 3b) When a document is set in an auto-document feeder (ADF); 4b) When a platen (a cover) is open or closed; and 5b) When the detection signal input from the human body detector 130 indicates "person present".

In the human body detector failing mode, the operating status of the image forming apparatus is shifted from the "energy-saving mode" to the "standby mode" when one of the following conditions 4b), 5b) and 6b) is satisfied. The conditions 4b), 5b) and 6b) are as follows. 4b) When the print data are input; 5b) When a document is set in the ADF; and 6b) When the platen is open or closed.

Figure 4A:
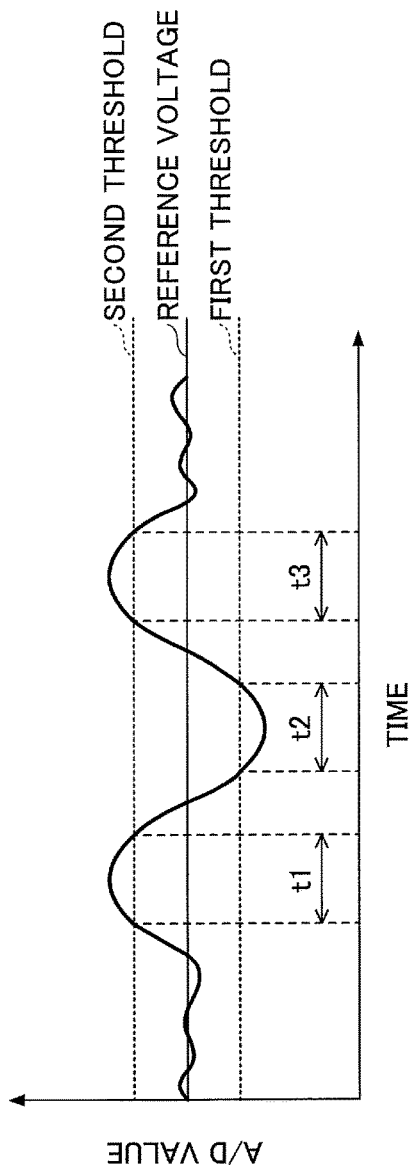
FIGS. 4A and 4B are diagrams illustrating a relationship between an A/D value and a binary signal.
Figure 4B:
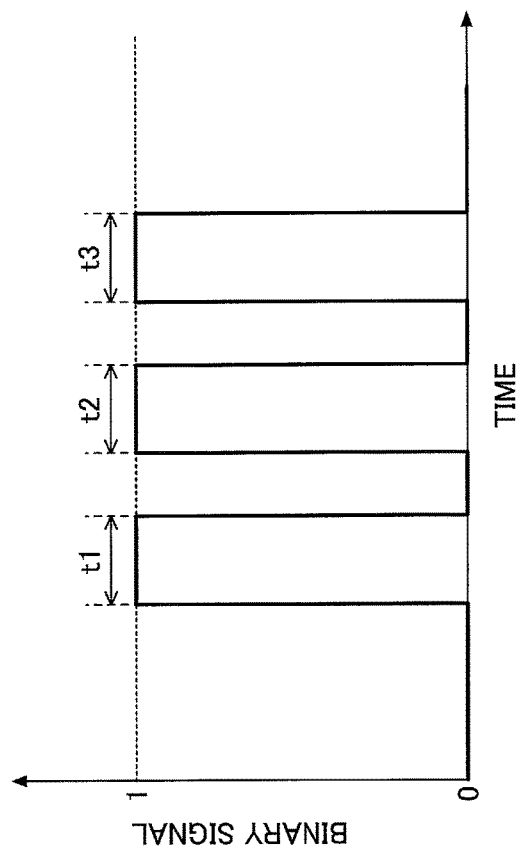

The following illustrates the conversion from the A/D value to the binary signal performed by the processor part 133. FIGS. 4A and 4B are diagrams illustrating a relationship between an A/D value and a binary signal. More specifically, FIG. 4A is a graph illustrating a relationship between the A/D value and time, and FIG. 4B is a graph illustrating a relationship between the binary signal and time.

As illustrated in FIGS. 4A and 4B, when the A/D value is a first threshold (time t2) or lower, or the A/D value is a second threshold (times t1, and t3) or above, the processor part 133 determines that the human body sensor 19 has detected a human body, and transmits a binary signal "1" ("person present") to the system controller 110. On the other hand, when the A/D value is greater than the first threshold, and is less than the second threshold (time excluding times t1, t2, and t3), the processor part 133 determines that the human body sensor 19 has not detected a human body, and transmits a binary signal "0" ("person absent") to the system controller 110.

Figure 5:
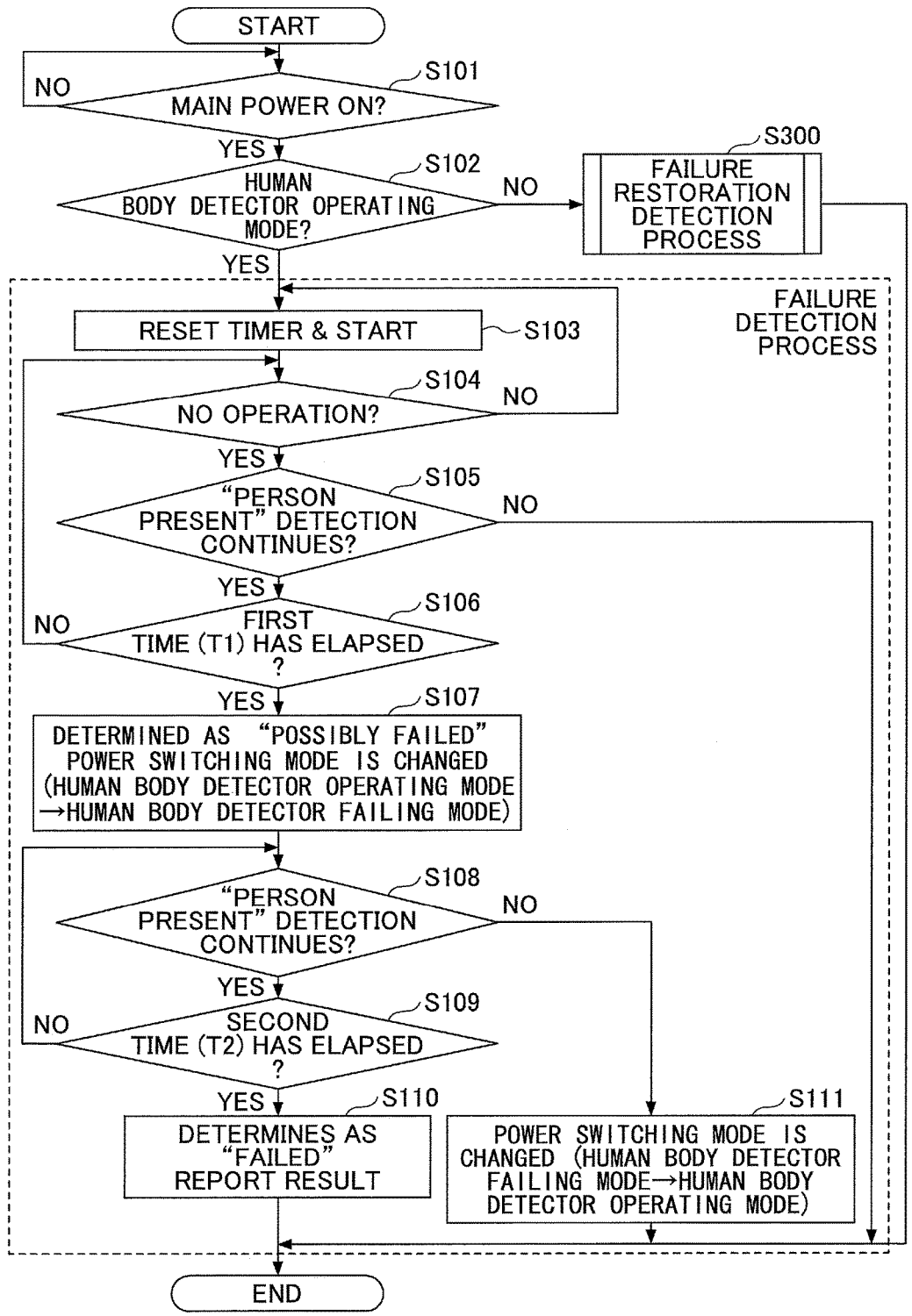
FIG. 5 is a flowchart illustrating an operational example of the image forming apparatus according to the first embodiment.

Next, an illustration is given of operations of the image forming apparatus. FIG. 5 is a flowchart illustrating an operational example of the image forming apparatus according to the first embodiment.

When the main power is turned on (step S101), the system controller 110 causes the electricity supply status switcher 115 to determine whether the power switching mode is the "human body detector operating mode" (step S102).

When the power switching mode is determined as being the "human body detector operating mode" in step S102, the system controller 110 resets the timer part 114, and subsequently starts measuring time (step S103). When the power switching mode is determined as not being the "human body detector operating mode" in step S102, the system controller 110 causes the failure restoration determination part 112 to execute a failure restoration determination process (step S300). Details of the failure restoration determination process will be described later.

Subsequently, the system controller 110 causes the operations receiver 116 to determine whether the operations device 13 is operated (step S104). When the operations device 13 is determined as not being operated in step S104, step S105 is processed. When the operations device 13 is determined as being operated in step S104, step S103 is processed again.

Subsequently, the system controller 110 causes the failure determination part 111 to determine whether the human body detector 130 is continuously detecting the "person present" (step S105). When the failure determination part 111 determines that the human body detector 130 is continuously detecting the "person present" in step S105, step S106 is processed. When the failure determination part 111 determines that the human body detector 130 is not continuously detecting the "person present" in step S105, the failure determination part 111 determines the human body sensor 19 is normal to end the process.

Subsequently, the system controller 110 causes the timer part 114 to determine whether the first time T1 has elapsed (step S106). When the timer part 114 determines that the first time T1 has elapsed in step S106, the system controller 110 causes the failure determination part 111 to determine that the human body sensor 19 may have "possibly failed", and subsequently causes the electricity supply status switcher 115 to change the power switching mode from the "human body detector operating mode" to the "human body detector failing mode" (step S107). When the timer part 114 determines that the first time T1 has not elapsed in step S106, step S104 is processed again.

Subsequently, the system controller 110 causes the failure determination part 111 to determine whether the human body detector 130 is continuously detecting the "person present" (step S108). When the failure determination part 111 determines that the human body detector 130 is continuously detecting the "person present" in step S108, step S109 is processed. When the failure determination part 111 determines that the human body detector 130 is not continuously detecting the "person present" in step S108, the system controller 110 causes the failure determination part 111 to determine that the human body sensor 19 is "normal", subsequently causes the electricity supply status switcher 115 to change the power switching mode from the "human body detector failing mode" to the "human body detector operating mode" (step S111), and ends the process.

Subsequently, the system controller 110 causes the timer part 114 to determine whether the second time T2 has elapsed (step S109). The second time T2 is set to be longer than the first time T1. When the timer part 114 determines that the second time T2 has elapsed in step S109, the system controller 110 causes the failure determination part 111 to determine that the human body sensor 19 has "failed", and subsequently causes the failure information storage 113 to store failure information such as the presence or absence of the failure, and types of the failure as well as reporting a failure result of the human body sensor 19 (step S110). For example, the system controller 110 may report the failure of the human body sensor 19 by displaying the failure report on the display device 14 to let a service person know about the failure, by reporting the failure to a service person via a communications system connected to the interface device 15, or by a combination of these methods. When the timer part 114 determines that the second time T2 has not elapsed in step S109, step S108 is processed again.

As illustrated above, according to the first embodiment, when the operations device 13 is not operated but the human body detector 130 continuously detects the "person present", the system controller 110 determines that the human body sensor 19 may have "possibly failed" before finally determines that the human body sensor 19 has "failed". When the system controller 110 determines that the human body sensor 19 is "normal" between a period from the determination of "possibly failed" to the determination of "failed", the system controller 110 will not report that the human body sensor 19 has failed. Erroneous determination of failure may thus be reduced. An erroneous report indicating reporting the failure of the device that has not actually failed may also be reduced.

In the first embodiment, when the human body sensor 19 is determined as "possibly failed", the system controller 110 causes the electricity supply status switcher 115 to change the power switching mode from the "human body detector operating mode" to the "human body detector failing mode". Thus, the operating status of the image forming apparatus may be changed from the "standby mode" to the "energy-saving mode" before the determination of "failed" and after the determination of "possibly failed" is made. Ineffective electric energy consumption may be reduced as a result.

Second Embodiment

Figure 6:
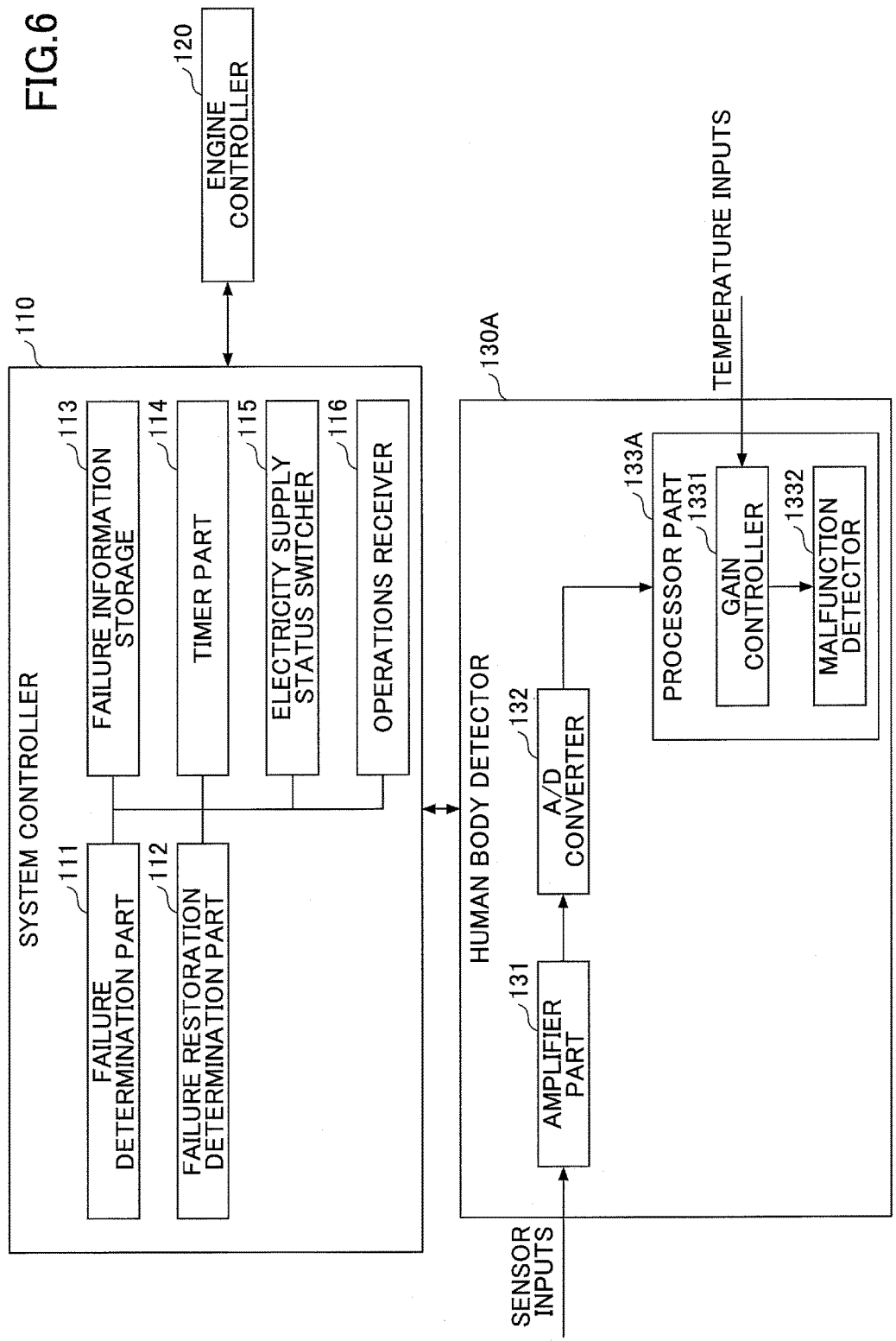
FIG. 6 is a diagram illustrating a functional configuration example of an image forming apparatus according to a second embodiment.

The following describes a hardware configuration of an image forming apparatus according to a second embodiment. FIG. 6 is a diagram illustrating a functional configuration example of the image forming apparatus according to the first embodiment.

The image forming apparatus according to the second embodiment differs from the image forming apparatus according to the first embodiment in that the human body detector 130 in the first embodiment is replaced with a human body detector 130A in the second embodiment. Note that configurations of other parts and components of the second embodiment are similar to those of the first embodiment, the following mainly illustrates the difference from the first embodiment.

As illustrated in FIG. 6, the image forming apparatus includes the system controller 110, the engine controller 120, and the human body detector 130A.

The human body detector 130A includes the amplifier part 131, the A/D converter 132, and a processor part 133A.

The processor part 133A includes a gain controller 1331, and a malfunction detector 1332.

The gain controller 1331 is configured to change gain of the amplifier part 131 based on the A/D value. More specifically, when the A/D value is the maximum value of the A/D converter 132 continuously for a predetermined time, the gain controller 1331 reduces the gain of the amplifier part 131. A reducing ratio of the gain may be 50%.

Alternatively, the gain controller 1331 may change the gain of the amplifier part 131 based on the temperature measured by the temperature sensor 20. More specifically, when the temperature measured by the temperature sensor 20 is low, the gain controller 1331 may reduce the gain of the amplifier part 131. When the temperature measured by the temperature sensor 20 is high, the gain controller 1331 may raise the gain of the amplifier part 131. Hence, since the gain of the amplifier part 131 is adjusted in accordance with an ambient temperature of the image forming apparatus under the environment where the ambient temperature of the image forming apparatus changes, a human body may be detected with high accuracy.

When the gain of the amplifier part 131 is changed based on the A/D value, the gain controller 1331 may determine a changing ratio of the gain of the amplifier part 131 based on the temperature measured by the temperature sensor 20. The changing ratio of the gain of the amplifier part 131 may be determined based on temperature characteristics of the human body sensor 19.

The malfunction detector 1332 is configured to detect whether the human body sensor 19 malfunctions based on the A/D value. More specifically, when the A/D value achieves the maximum value of the A/D converter 132 continuously for a predetermined time, and the A/D value still maintains the maximum value of the A/D converter 132 despite that the gain controller 1331 reduces the gain of the amplifier part 131, the malfunction detector 1332 switches a malfunction signal on and transmits the malfunction signal to the system controller 110.

Figure 7:
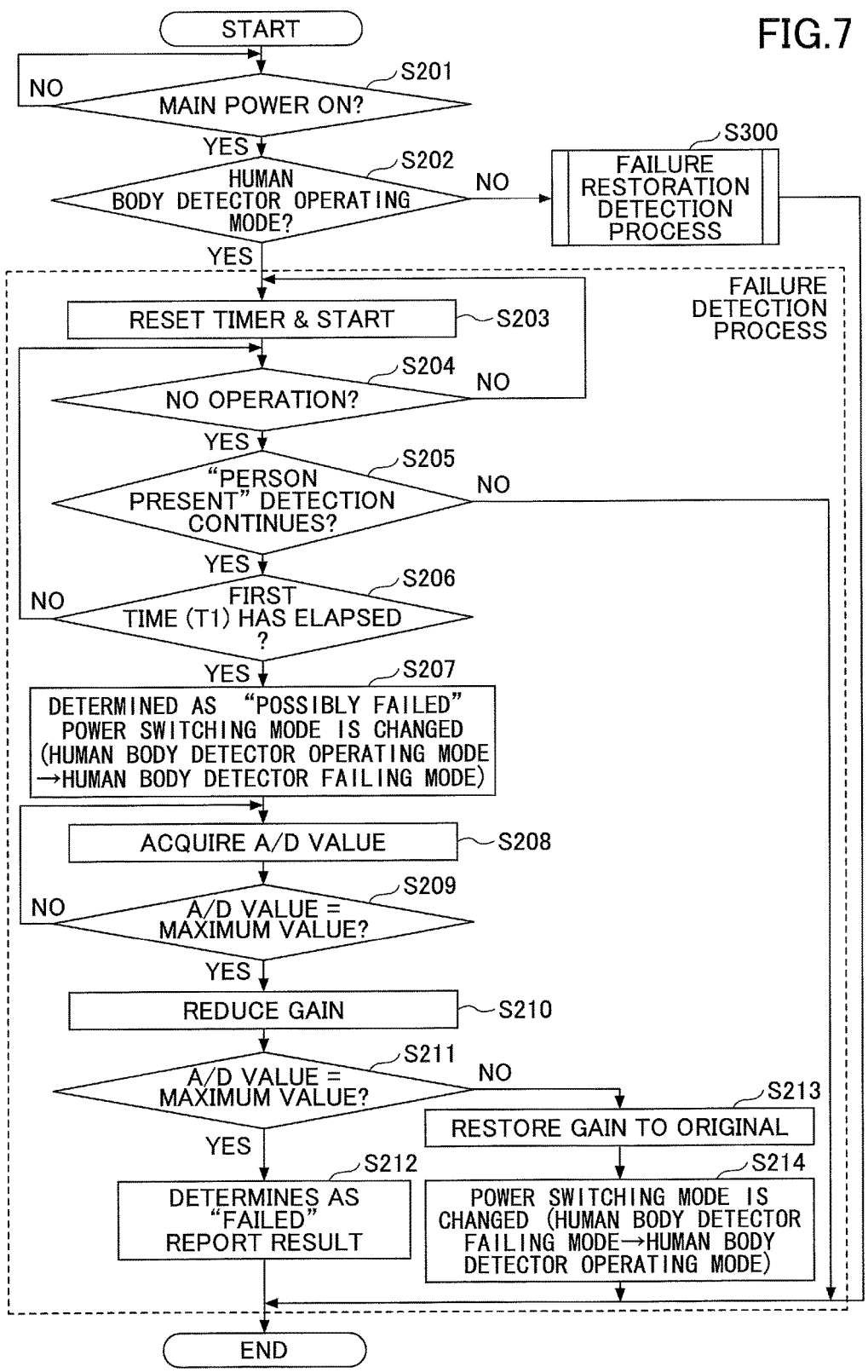
FIG. 7 is a flowchart illustrating an operational example of the image forming apparatus according to the second embodiment.

Next, an illustration is given of operations of the image forming apparatus. FIG. 7 is a flowchart illustrating an operational example of the image forming apparatus according to the second embodiment.

Initially, steps S201 to S207 are executed in a manner similar to steps S101 to S107 illustrated in the first embodiment.

Subsequently, the processor part 133A causes the gain controller 1331 to acquire the A/D value (step S208) to determine whether the A/D value is the maximum value of the A/D converter 132 (step S209).

When the gain controller 1331 determines that the A/D value is the maximum value of the A/D converter 132 in step S209, the gain controller 1331 reduces the gain of the amplifier part 131 (step S210). When the gain controller 1331 determines that the A/D value is not the maximum value of the A/D converter 132 in step S209, step S208 is processed again.

Subsequently, the processor part 133A determines whether the A/D value obtained after the gain of the amplifier part 131 is reduced is the maximum value of the A/D converter 132 (step S211).

When the processor part 133A determines that the A/D value is the maximum value of the A/D converter 132 in step S211, the processor part 133A causes the malfunction detector 1332 to turn the abnormal signal on to transmit the turned-on abnormal signal to the system controller 110. When the system controller 110 that has received the turned-on abnormal signal causes the failure determination part 111 to determine that the human body sensor 19 has "failed", the system controller 110 transmits a report that the human body sensor 19 has failed while storing the failure information such as the presence or absence of failure and the types of the failure (step S212).

When the processor part 133A determines that the A/D value is not the maximum value of the A/D converter 132 in step S211, the processor part 133A causes the malfunction detector 1332 to turn the abnormal signal off to transmit the turned-off abnormal signal to the system controller 110. The processor part 133A also cases the gain controller 1331 to restore the gain of the amplifier part 131 to the original value (step S213). The system controller 110 that has received the turned-off abnormal signal causes the failure determination part 111 to determine that the human body sensor 19 is "normal", and subsequently causes the electricity supply status switcher electricity supply status switcher 115 to switch the power switching mode from the "human body detector failing mode" to the "human body detector operating mode" (step S214), and then ends the process.

Figure 8:
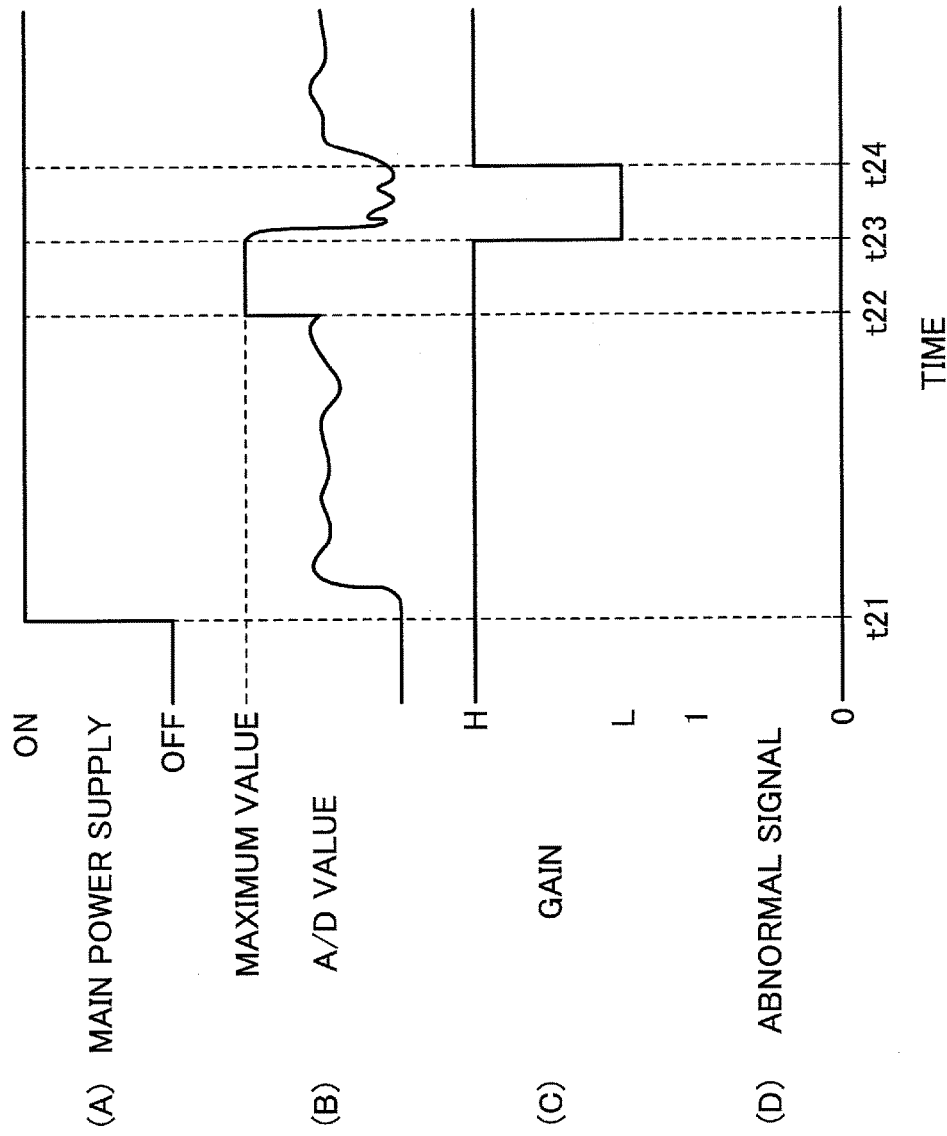
FIG. 8 is a timing chart illustrating a change in gain of an amplifier part based on an A/D value.
Figure 9:
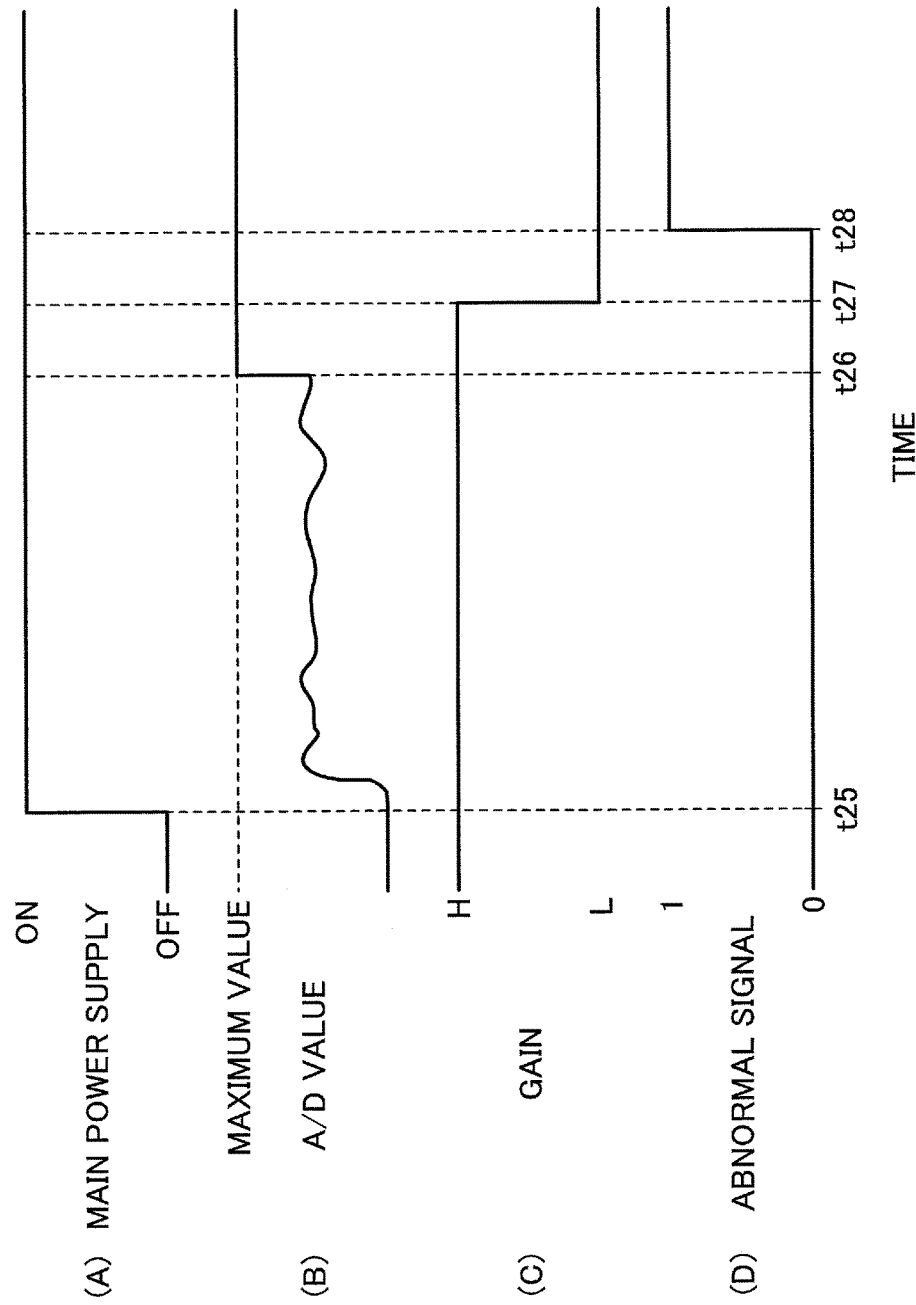
FIG. 9 is a timing chart illustrating a change in gain of an amplifier part based on an A/D value.

Next, an illustration is given of a change of the gain amplifier part 131 based on the A/D value. FIGS. 8 and 9 are timing charts illustrating a change in gain of an amplifier part based on an A/D value. The waveforms of FIGS. 8 and 9 are (A) ON/OFF of the main power, (B) the A/D value of the A/D converter 132, (C) the gain of the amplifier part 131, and (D) the abnormal signal of the malfunction detector 1332.

In the example of FIG. 8, when the main power of the image forming apparatus is turned on (time t21), and subsequently the A/D value becomes equal to the maximum value of the A/D converter 132 (time t22), whether the A/D value is the maximum value of the A/D converter 132 is continuously monitored for a predetermined time (t22 to t23). As illustrated in FIG. 8, since the A/D value is continuously equal to the maximum value of the A/D converter 132 for the predetermined time (t22 to t23), the gain controller 1331 reduces the gain of the amplifier part 131 (time t23).

Subsequently, the gain controller 1331 monitors the A/D value for a predetermined time (t23 to t24) to see whether the A/D value maintains the maximum value of the A/D converter 132. In FIG. 8, since the A/D value lowers from the maximum value of the A/D converter 132 within the predetermined time (t23 to t24), the malfunction detector 1332 determines that the human body sensor 19 is "normal", turns off the abnormal signal (time t24), and transmits the turned-off abnormal signal to the system controller 110. The gain controller 1331 restores the gain of the amplifier part 131 to the original value that is the gain of the amplifier part 131 before being changed (time t24)).

In the example of FIG. 9, when the main power of the image forming apparatus is turned on (time t25), and subsequently the A/D value becomes equal to the maximum value of the A/D converter 132 (time t26), whether the A/D value is the maximum value of the A/D converter 132 is continuously monitored for a predetermined time (t26 to t27). As illustrated in FIG. 9, since the A/D value is continuously equal to the maximum value of the A/D converter 132 for the predetermined time (t26 to t27), the gain controller 1331 reduces the gain of the amplifier part 131 (time t27).

Subsequently, the gain controller 1331 monitors the A/D value for a predetermined time (t27 to t28) to see whether the A/D value maintains the maximum value of the A/D converter 132. In FIG. 9, since the A/D value is continuously equal to the maximum value of the A/D converter 132 for the predetermined time (t27 to t28), the malfunction detector 1332 determines that the human body sensor 19 is "abnormal", turns on the abnormal signal (time t28), and transmits the turned-on abnormal signal to the system controller 110.

As illustrated above, the second embodiment, it may be possible to provide effects similar to those of the first embodiment.

Specifically, in the second embodiment, the following effect may provided. When the human body sensor 19 is determined as "possibly failed", and subsequently the A/D value is continuously equal to the maximum value of the A/D converter 132 for a predetermined time, the gain controller 1331 reduces the gain of the amplifier part 131. Then, when the A/D value obtained after the gain is reduced does not lower from the maximum value of the A/D converter 132, the system controller 110 determines that the human body sensor 19 has "failed". Accordingly, the human body sensor 19 may be determined as "failed" immediately after being determined as "possibly failed".

Third Embodiment

A third embodiment illustrates an example of the failure restoration determination process in the operations of the image forming apparatus illustrated according to the first embodiment. Note that the failure restoration determination process illustrated in the third embodiment may also be applied to the failure restoration determination process in the operations of the image forming apparatus illustrated in the second embodiment.

Figure 10:
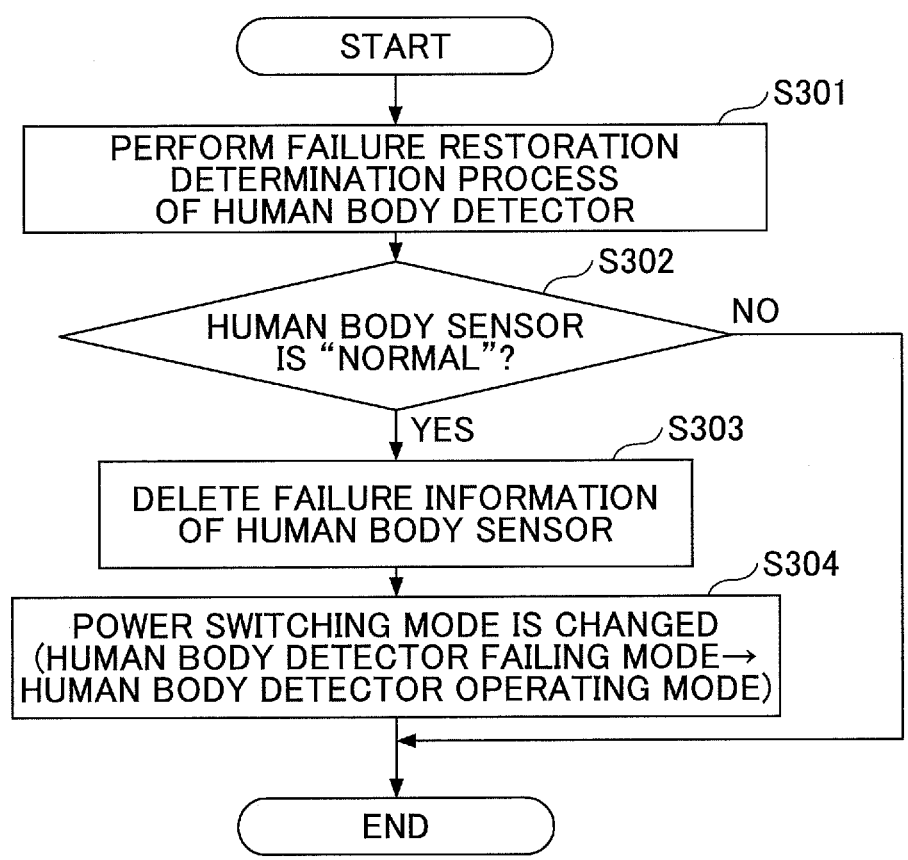
FIG. 10 is a flowchart illustrating an example of a failure restoration determination process of a third embodiment.

FIG. 10 is a flowchart illustrating an example of the failure restoration determination process of the third embodiment. FIG. 11 is an explanatory diagram illustrating the failure restoration determination process of the third embodiment. In FIG. 11, the upper row indicates time series and the lower row indicates detection signals input from the human body detector 130.

Initially, the system controller 110 causes the failure restoration determination part 112 to perform the failure restoration determination process of the human body detector 130 (step S301) so as to determine whether the human body sensor 19 is "normal" (step S302).

As illustrated in FIG. 11, the system controller 110 causes the failure restoration determination part 112 to monitor the detection signals ("1" or "0") input from the human body detector 130. When the detection signal is changed from "1" to "0" or from "0" to "1" (time series 7 to 8), the failure restoration determination part 112 determines that the human body sensor 19 is restored from the "failed" status, and that the human body sensor 19 is "normal". The system controller 110 causes the failure restoration determination part 112 to monitor the detection signal input from the human body detector 130 to determine that the human body sensor 19 is continuously not "normal", that is, the human body sensor 19 has continuously been in the "failed" status when the detection signal is continuously "1" or "0".

When the human body sensor 19 is determined as "normal" in step S302, the system controller 110 causes the failure information storage 113 to delete failure information of the human body sensor 19 (step S303), and then proceeds with step S304. When the human body sensor 19 is determined as "not normal" in step S302, the system controller 110 ends the process.

Subsequently, the system controller 110 causes the electricity supply status switcher 115 to change the power switching mode from the "human body detector failing mode" to the "human body detector operating mode" (step S304), and then ends the process.

As illustrated above, in the third embodiment, the power switching mode is changed from the "human body detector failing mode" to the "human body detector operating mode" based on the detection signal input from the human body detector 130. Accordingly, even if the power switching mode is not changed from the "human body detector failing mode" to the "human body detector operating mode" after the failed human body sensor 19 has been fixed by the service person, the power switching mode is automatically changed to the "human body detector operating mode". Thus, it may be possible to reduce downtime of the human body detecting device as well as reducing ineffective electric energy consumption.

Fourth Embodiment

A fourth embodiment illustrates another example of the failure restoration determination process in the operations of the image forming apparatus illustrated according to the first embodiment. Note that the failure restoration determination process illustrated in the fourth embodiment may also be applied to the failure restoration determination process in the operations of the image forming apparatus illustrated in the second embodiment.

Figure 12:
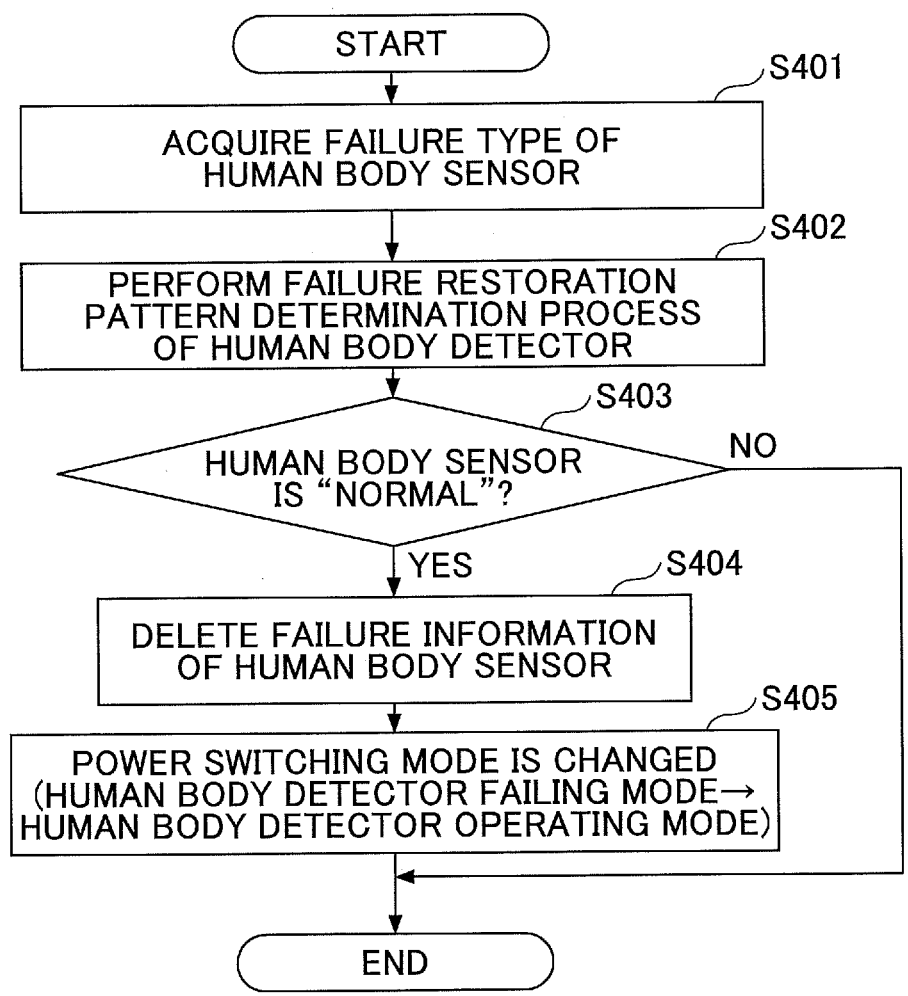
FIG. 12 is a flowchart illustrating an example of a failure restoration determination process of a fourth embodiment.

FIG. 12 is a flowchart illustrating an example of the failure restoration determination process of the fourth embodiment. FIG. 13 is an explanatory diagram illustrating the failure restoration determination process of the fourth embodiment. In FIG. 13, the first row from the top indicates time series, the second row indicates a failure pattern A, the third row indicates a failure pattern B, and the fourth row indicates a detection signal input from the human body detector 130.

The failure pattern A illustrates the detection signal input from the human body detector 130 that exhibits constantly "1". The failure pattern B illustrates the detection signal input from the human body detector 130 that exhibits constantly "0".

Initially, the system controller 110 causes the failure information storage 113 to acquire failure type information of the failure information of the human body sensor 19 (step S401).

Subsequently, the system controller 110 causes the failure restoration determination part 112 to perform a failure restoration pattern determination process of the human body detector 130 (step S402) so as to determine whether the human body sensor 19 is "normal" (step S403).

Specifically, when the failure type of the human body sensor 19 indicates the failure of the detection signal exhibiting constantly "1", the system controller 110 causes the failure restoration determination part 112 to monitor the detection signal ("1" or "0") input from the human body detector 130, and compare the detection signal and the failure pattern A in accordance with the type of the failure (see the second row in FIG. 13). For example, when a detection result indicating the detection signal input from the human body detector 130 failing to match the failure pattern A is continuously detected 1000 times within a predetermined time (e.g., within 10 s), the system controller 110 causes the failure restoration determination part 112 to determine that the human body sensor 19 has been restored from the failure, and determines that the human body sensor 19 is "normal". On the other hand, when a detection result indicating the detection signal input from the human body detector 130 failing to match the failure pattern A is not continuously detected 1000 times within the predetermined time, the system controller 110 causes the failure restoration determination part 112 to determine that the human body sensor 19 is "not normal".

Further, when the failure type of the human body sensor 19 indicates the failure of the detection signal exhibiting constantly "0", the system controller 110 causes the failure restoration determination part 112 to monitor the detection signal input from the human body detector 130, and compare the detection signal and the failure pattern B in accordance with the type of the failure (see the third row in FIG. 13). Then, when a detection result indicating the detection signal input from the human body detector 130 failing to match the failure pattern B is continuously detected 100 times within the predetermined time (e.g., within 10 s), the system controller 110 causes the failure restoration determination part 112 to determine that the human body sensor 19 has been restored from the failure, and determines that the human body sensor 19 is "normal". On the other hand, when a detection result indicating the detection signal input from the human body detector 130 failing to match the failure pattern B is not continuously detected 100 times within the predetermined time, the system controller 110 causes the failure restoration determination part 112 to determine that the human body sensor 19 is "not normal".

When the human body sensor 19 is determined as "normal" in step S403, the system controller 110 causes the failure information storage 113 to delete failure information of the human body sensor 19 (step S404), and then proceeds with step S405. When the human body sensor 19 is determined as "not normal" in step S403, the system controller 110 ends the process.

Subsequently after step S404, the system controller 110 causes the electricity supply status switcher 115 to change the power switching mode from the "human body detector failing mode" to the "human body detector operating mode" (step S405), and then ends the process.

As illustrated above, in the fourth embodiment, relationships between expected failure types and detectable signals may be set as patterns in advance, and restoration conditions may be set based on the respective failure types. As a result, accuracy in the failure restoration determination may be improved, thereby reducing erroneous failure restoration determination of erroneously determining the human body sensor 19 being restored despite the fact that the human body sensor 19 has not been restored from failure.

Fifth Embodiment

A fifth embodiment illustrates still another example of the failure restoration determination process in the operations of the image forming apparatus illustrated according to the first embodiment. Note that the failure restoration determination process illustrated in the fifth embodiment may also be applied to the failure restoration determination process in the operations of the image forming apparatus illustrated in the second embodiment.

Figure 14:
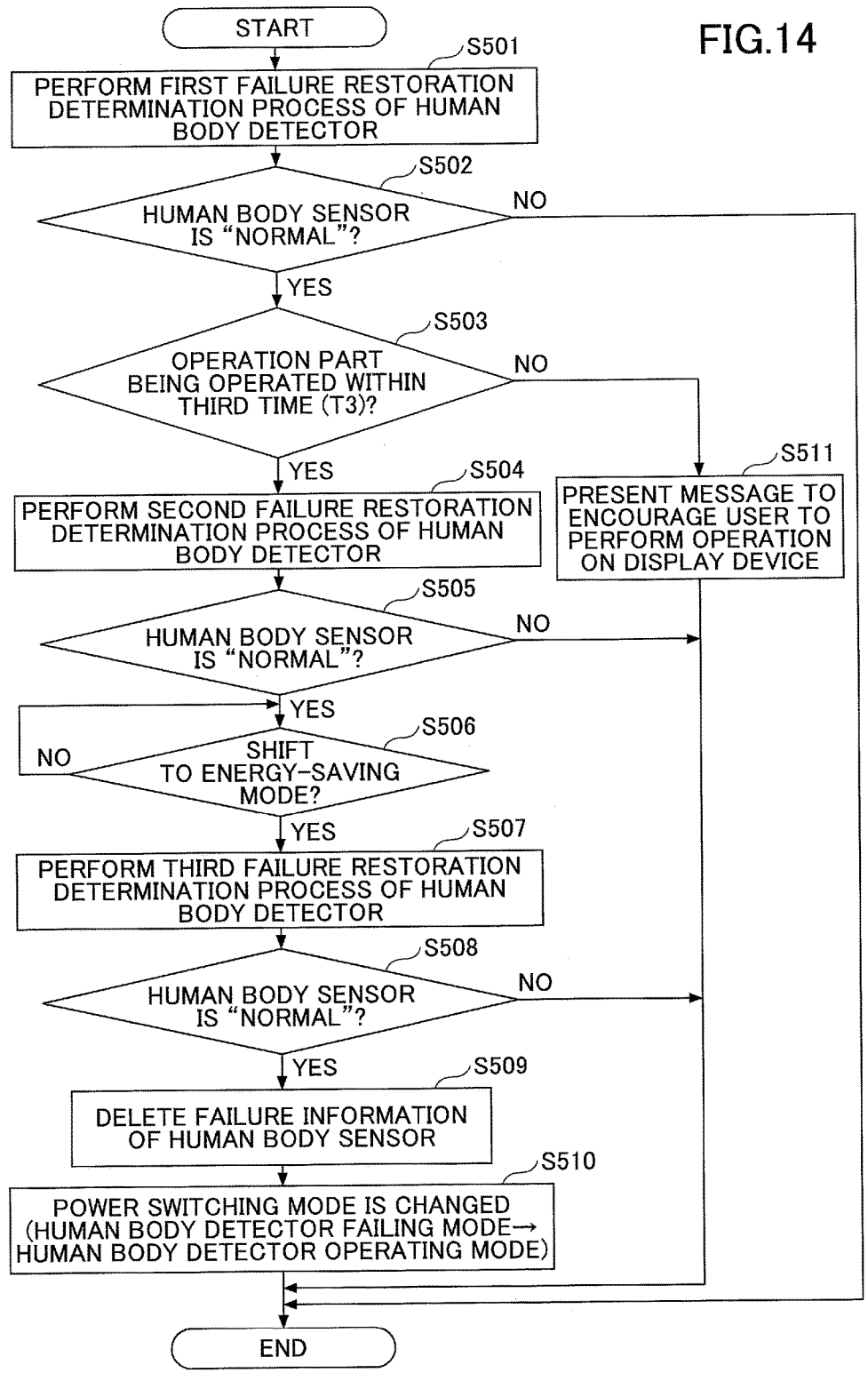
FIG. 14 is a flowchart illustrating an example of a failure restoration determination process of a fifth embodiment.

FIG. 14 is a flowchart illustrating an example of the failure restoration determination process of the fifth embodiment. FIG. 15 is an explanatory diagram illustrating the failure restoration determination process of the fifth embodiment. In FIG. 15, the upper row indicates time series and the lower row indicates detection signals input from the human body detector 130.

Initially, the system controller 110 causes the failure restoration determination part 112 to perform a first failure restoration determination process of the human body detector 130 (step S501) so as to determine whether the human body sensor 19 is "normal" (step S502).

As illustrated in FIG. 15, the system controller 110 causes the failure restoration determination part 112 to monitor the detection signal ("1" or "0") input from the human body detector 130. When the detection signal is changed from "1" to "0" or from "0" to "1" (time series 7 to 8), the failure restoration determination part 112 determines that the human body sensor 19 is restored from the "failed" status, and that the human body sensor 19 is "normal". The system controller 110 causes the failure restoration determination part 112 to monitor the detection signal input from the human body detector 130 to determine that the human body sensor 19 is continuously not "normal", that is, the human body sensor 19 has continuously been in the "failed" status when the detection signal is continuously "1" or "0".

When the human body sensor 19 is determined as "normal" in step S503, the system controller 110 proceeds with step S503. When the human body sensor 19 is determined as "not normal" in step S502, the system controller 110 ends the process.

Subsequently, the system controller 110 causes the timer part 114 or the operations receiver 116 to determine whether the operations device 13 is operated within the third time T3 (step S503).

When the timer part 114 or the operations receiver 116 determines that the operations device 13 is operated within the third time T3 in step S503, the failure restoration determination part 112 performs a second failure restoration determination process of the human body detector 130 (step S504), and determines whether the human body sensor 19 is "normal" (step S505).

As illustrated in FIG. 15, the system controller 110 causes the failure restoration determination part 112 to determine that the human body sensor 19 is "normal" when the detection signal input from the human body detector 130 is "1" predetermined times set in advance (time series 12 to 13). On the other hand, the system controller 110 causes the failure restoration determination part 112 to determine that the human body sensor 19 is "not normal" when the detection signal input from the human body detector 130 is not "1" predetermined times set in advance. Note that the predetermined times may be 500 times.

When the timer part 114 or the operations receiver 116 determines that the operations device 13 is not operated within the third time T3 in step S503, the system controller 110 present a message on the display device 14 to encourage a user to operate the operations device 13 (step S511), and then ends the process.

When the human body sensor 19 is determined as "normal" in step S505, the system controller 110 proceeds with step S506. When the human body sensor 19 is determined as "not normal" in step S505, the system controller 110 ends the process.

Subsequently, the system controller 110 monitors whether the image forming apparatus shifts to the energy-saving mode (step S506).

When the image forming apparatus shifts to the energy-saving mode in step S506, the system controller 110 causes the failure restoration determination part 112 to perform a third failure restoration determination process of the human body detector 130 (step S507) so as to determine whether the human body sensor 19 is "normal" (step S508).

As illustrated in FIG. 15, the system controller 110 causes the failure restoration determination part 112 to determine that the human body sensor 19 is "normal" when the detection signal input from the human body detector 130 indicates "0" predetermined times set in advance (time series 22 to 24). On the other hand, the system controller 110 causes the failure restoration determination part 112 to determine that the human body sensor 19 is "not normal" when the detection signal input from the human body detector 130 is not "0" predetermined times set in advance. Note that the predetermined times may be 1000 times.

When the image forming apparatus does not shift to the energy-saving mode in step S506, the system controller 110 repeats step S506.

When the human body sensor 19 is determined as "normal" in step S508, the system controller 110 causes the failure information storage 113 to delete failure information of the human body sensor 19 (step S509), and then proceeds with step S510. When the human body sensor 19 is determined as "not normal" in step S508, the system controller 110 ends the process.

Subsequently, the system controller 110 causes the electricity supply status switcher 115 to change the power switching mode from the "human body detector failing mode" to the "human body detector operating mode" (step S510), and then ends the process.

As illustrated above, in the fifth embodiment, the system controller 110 changes the power switching mode from the "human body detector failing mode" to the "human body detector operating mode" after determining that the human body sensor 19 functions at two or more timing. As a result, accuracy in the failure restoration determination may be improved, thereby reducing erroneous failure restoration determination of erroneously determining the human body sensor 19 being restored despite the fact that the human body sensor 19 has not been restored from failure.

According to the above-described embodiments, the electric energy consumption may be controlled.

The human body detecting device, the image forming apparatus, and the method for controlling the human body detecting device are described based on the embodiments; however, the present invention is not limited to the embodiments described above. Various alteration and modification may be made within the scope of the claims.

The present invention is not limited to the specifically disclosed embodiments, and variations and modifications may be made without departing from the scope of the present invention.

What is claimed is:

1. A detecting device comprising:
    a human body detector configured to detect a human body; and
    an electric power supply status switching part configured to switch a first shifting mode to a second shifting mode when the detecting device is not operated, and the human body detector continuously detects the human body for a predetermined time,
    the first shifting mode indicating a first status shifting to a second status based on a first condition which includes at least a detecting result of the human body detector, the second status representing electric energy consumption less than electric energy consumption of the first status,
    the second shifting mode indicating the first status shifting to the second status based on a second condition other than the first condition, and
    the electric power supply status switching part switches from the second shifting mode to the first shifting mode in response to a predetermined condition being satisfied after switching to the second shifting mode.

2. The detecting device as claimed in claim 1, wherein the second condition includes at least one of:
    a condition in which an operation to shift the first status to the second status with respect to the detecting device is received, and
    a condition in which a predetermined time has elapsed after the operation has finished in the first status.

3. The human body detecting device as claimed in claim 1, wherein
    the electric power supply status switching part switches the second shifting mode to the first shifting mode when the human body detector does not detect the human body after the first shifting mode is switched to the second shifting mode.

4. The detecting device as claimed in claim 1, wherein the human body detector includes:
    an amplifier part configured to amplify a signal output at a time at which the human body is detected,
    an A/D converter configured to convert the signal amplified by the amplifier part into an A/D value, and
    a gain controller configured to control gain of the amplifier part based on the A/D value,
    wherein the gain controller reduces the gain of the amplifier part in a case where the A/D value continuously matches a maximum value of the A/D converter for a predetermined time, and
    the electric power supply status switching part switches the first mode to the second mode in a case where the A/D value at a time at which the gain is reduced matches the maximum value of the A/D converter.

5. The detecting device as claimed in claim 4, wherein the gain controller controls the gain of the amplifier part based on an ambient temperature of the detecting device.

6. The detecting device as claimed in claim 1, further comprising:
    a failure restoration determination part configured to determine whether to switch the second shifting mode to the first shifting mode, based on whether a signal detected by the human body detector changes within a predetermined time in a case where the detecting device is in the second shifting mode.

7. The detecting device as claimed in claim 1, further comprising:
    a failure information storage configured to store failure information; and
    a failure restoration determination part configured to determine whether to switch the second shifting mode to the first shifting mode, based on a signal detected by the human body detector, and a failure pattern set in advance according to the failure information in a case where the detecting device is in the second shifting mode.

8. The detecting device as claimed in claim 1, further comprising:
    a failure restoration determination part configured to acquire a signal detected by the human body detector at a plurality of times, and determine whether to switch the second shifting mode to the first shifting mode, based on the signals acquired at the plurality of times in a case where the detecting device is in the second shifting mode.

9. An image forming apparatus comprising: the detecting device as claimed in claim 1.

10. A method for detecting a human body, the method being performed by a detecting device having a human body detector, the method comprising:
    detecting, by the human body detector, the human body; and
    switching a first shifting mode to a second shifting mode when the detecting device is not operated, and the human body detector continuously detects the human body for a predetermined time,
    the first shifting mode indicating a first status shifting to a second status based on a first condition which includes at least a detecting result of the human body detector, the second status representing electric energy consumption less than electric energy consumption of the first status,
    the second shifting mode indicating the first status shifting to the second status based on a second condition other than the first condition, and
    the method further comprises utilizing an electric power supply status switching part to switch from the second shifting mode to the first shifting mode in response to a predetermined condition being satisfied after switching to the second shifting mode.

11. The detecting device as claimed in claim 1, wherein:
    the first condition includes at least one of a condition in which the human body detector does not detect the human body.

12. The device according to claim 1, further comprising:
    a determination part configured to determine whether the human body detector is normal, wherein
    the electric power supply status switching part switches from the second shifting mode to the first shifting mode in response to the determination part determining that the human body detector is normal after switching to the second shifting mode.

13. The device according to claim 1, wherein:
    the predetermined condition is selected from the group consisting of:
        not continuously detecting the presence of a human body;
        determining that an A/D value, obtained after the gain of an amplifier part of the device is reduced, is the maximum value of an A/D converter; and a failure restoration determination part of the device determining that the human body sensor is in a normal mode of operation.

14. The human body detecting device as claimed in claim 11, wherein:
the first condition includes at least one of a condition in which the human body detector does not detect the human body when a predetermined time has elapsed after the operation ends in the first shifting mode.

15. The human body detecting device as claimed in claim 11, wherein:
the second condition includes at least one of a condition in which the human body detecting device switches the first status to the second status regardless of a detected result of the human body detector when the predetermined time has elapsed after the operation ends in the second shifting mode.

\* \* \* \* \*